Patented May 11, 1943

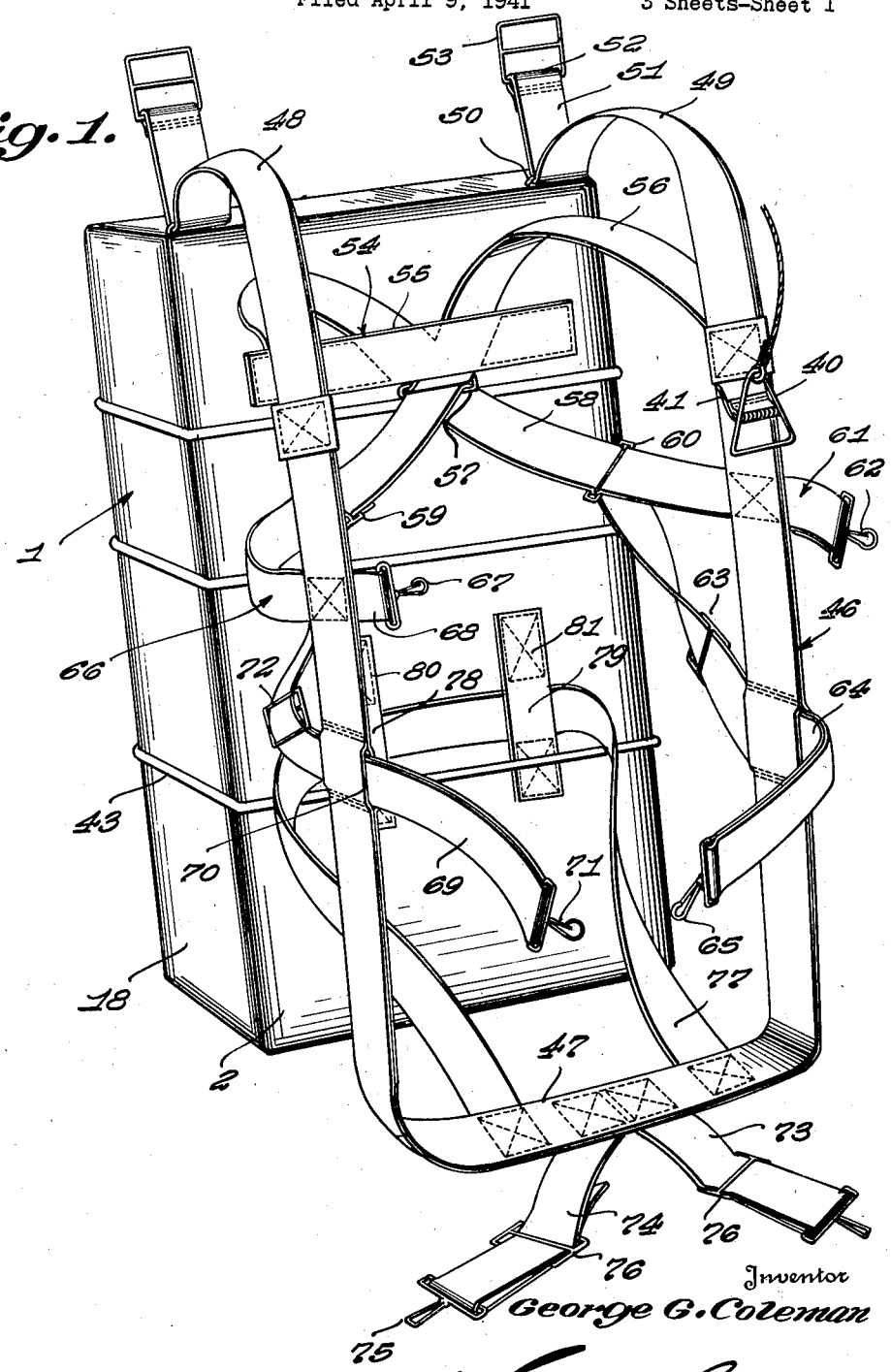

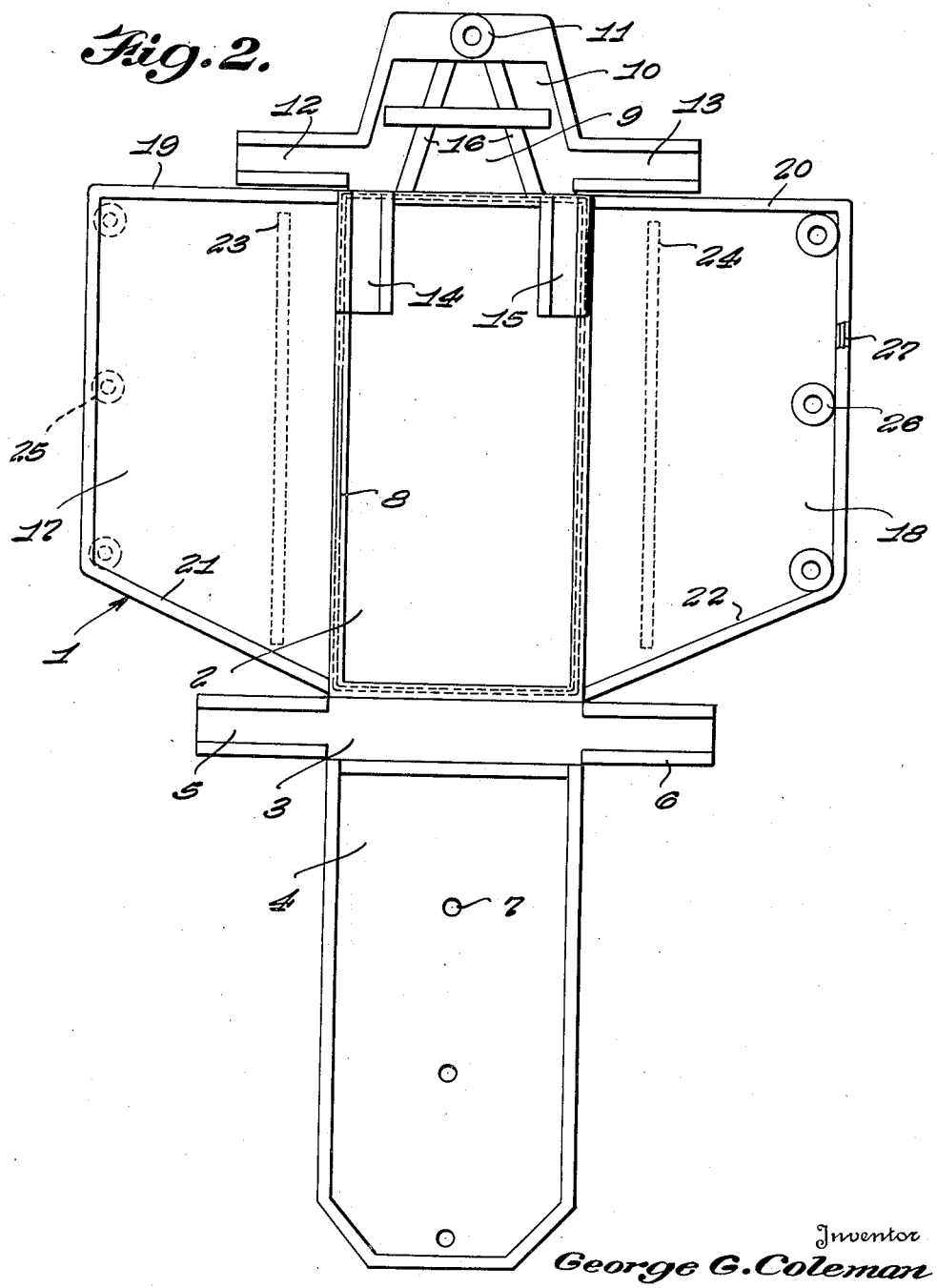

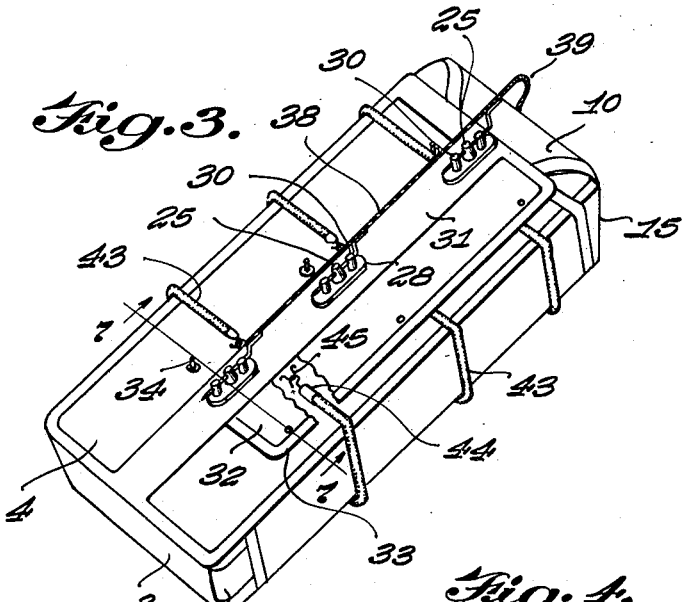
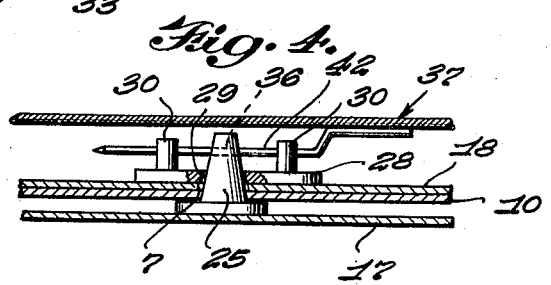
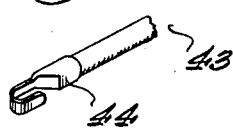
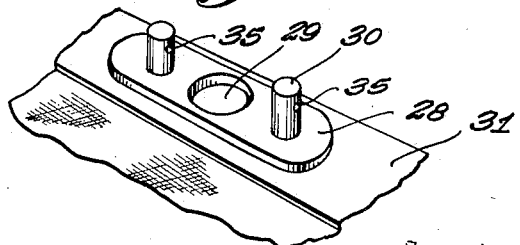
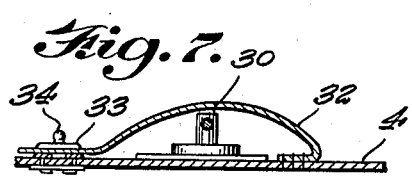

2,318,673

UNITED STATES PATENT OFFICE 2,318,673

PARACHUTE HARNESS AND PACK

George Gusters Coleman, Greenville, Miss., assignor to Zeppo Parachute Attachment Company, a corporation of Mississippi Application April 9, 1941, Serial No. 387,725

6 Claims. (Cl. 244—148)

This invention relates to parachutes and more particularly to an improved parachute harness and container.

One object of the invention is to provide a parachute harness and container which will be of such construction that it may be easily carried on the back of an aviator.

Another object of the invention is to provide a parachute harness and container which is of such construction that the rip cord handle will be conveniently positioned on the harness for quick manual engagement.

A further object of the invention is to provide parachute construction of this character employing improved releasing means for permitting opening of the pack upon pulling of the rip cord.

Still another object of the invention is to provide a parachute harness and container employing means enabling the harness to adjust itself automatically when in position on the aviator.

The invention seeks, as a further object, to provide a parachute harness and container wherein means is employed for reinforcing the container.

The invention seeks, as a still further object, to provide a parachute harness and container utilizing resilient means for assisting in opening the container upon release of the rip cord.

Still further objects of the invention, not mentioned specifically hereinbefore, will render themselves apparent during the course of the following description.

In the drawings forming a part of my application:

Figure 1 is a perspective view of my improved parachute harness and container as it would appear ready to be placed in use;

Figure 2 is a top plan view, on a reduced scale, of the container of my invention as it would appear laid out and ready for folding, Figure 3 is a perspective view of the container folded to operative position and showing particularly the rip cord and releasing mechanism, Figure 4 is an enlarged detail perspective view showing a portion of the rip cord releasing mechanism, Figure 5 is an enlarged detail perspective view showing the end portion of one of the resilient straps employed for assisting in the opening of the container after release of the rip cord, Figure 6 is an enlarged detail perspective view showing one of the locking plates employed in conjunction with the rip cord releasing mechanism, and Figure 7 is an enlarged detail sectional view on the line 7—7 of Figure 3.

By referring more particularly to the drawings, wherein like numerals of reference designate similar parts throughout the views, it will be seen that my invention consists of two units. That is to say, the invention includes a parachute harness and a parachute container which are operatively connected and associated with each other so as to render them interdependent in use. However, for the sake of simplicity, the harness unit and the container unit will be described separately and then the manner of connecting the units with each other will be set forth.

The parachute container will be described first and a description thereof follows hereinafter.

The parachute container of my invention is indicated generally at 1 and, as best seen in Figure 2, is formed from a single sheet of flexible fabric. The container 1 includes a rear wall 2, an end wall 3, which is secured to one end of the rear wall 2, and a front wall or closure 4 which is secured to the free end edge of the end wall 3. Closure flaps 5 and 6 are mounted on the side edges of the end wall 3 and project laterally therefrom. Formed in the front wall or closure 4 medially of its width and in longitudinal spaced relation are openings 7, the purpose for which will be set forth in more detail hereinafter. The walls 2 and 4 of the container have their margins reinforced by means of reinforcing strips 8.

Carried at the opposite end of the rear wall 2 from that to which the wall 3 is secured is an end wall 9 which is extended longitudinally and tapered to define a closure flap 10, said closure flap having a grommet 11 therein. The end wall 9 is also provided with laterally extending integral closure flaps 12 and 13 and longitudinally extending closure flaps 14 and 15. Reinforcing strips 16 are carried on the inner surface of the wall 9 and the closure flap 10.

Closing the sides of the container are side walls 17 and 18 which are of polygonal shape in top plan and which have their corresponding inner edges formed integrally with the corresponding side edges of the rear wall 2. The side walls 17 and 18 have corresponding straight upper end edges 19 and 20 respectively and inclined corresponding lower edges 21 and 22. Reinforcing strips 23 and 24 are mounted on the walls 17 and 18 and extend longitudinally thereof and in spaced relation to the corresponding inner end edges of said walls. Mounted on the free side margins of the wall 17 are latch posts 25 which latch posts are arranged in a spaced series, three of said posts being employed. In this connection it should be understood that a greater or less number of the latch posts may be used in accordance with particular requirements. The latch posts are adapted to extend through mating grommets 26 which are mounted on the free side margin of the wall 18. The posts 25 also are adapted to cooperate with the openings 7 and the grommet 11. The posts 25, and the grommets 11 and 26 and the opening 7 all form a part of the rip cord release mechanism which will be described in more detail hereinafter. The walls 17 and 18 are reinforced at their margins by means of metal strips 27 which will assist said walls to be retained in their proper shape and will thus properly confine a parachute of the type described in my pending application filed of even date herewith.

Sewed or otherwise suitably fastened to the upper surface of the front wall are spaced latch plates 28 which are formed with openings 29 alined with the openings 7 in said front wall. Each of the plates 28 carries a pair of anchoring posts 30 which are alined with each other and with the opening 29. The plates 28 are mounted on a reinforcing strip 31 which extends longitudinally of the wall 4 medially of its width and through its length. The plates 28, like the grommets 11 and 26 and the posts 25, form a part of the rip cord release mechanism.

Connected with the upper surface of the wall 4 and extending throughout substantially three-fourths of its length is a cover flap 32 which carries snap fasteners 33 on its outer margin. The flap is shiftable from the position shown in Figure 3 to that shown in Figure 7 wherein the fasteners 33 will be engaged with fastening posts 34 which are secured to the upper surface of the wall 4 at the opposite side of the strip 31. As will be seen, the cover flap protects the rip cord release mechanism and the rip cord and also defines a channel or passage in which the rip cord will be contained when in operative position.

When it is desired to make up the container 1 to enclose a parachute, the side walls 17 and 18 are folded inwardly about the parachute, the said side wall 17 being first folded into overlying relation with a portion of the parachute. Then the wall 18 is folded inwardly to overlie an additional portion of the parachute and to dispose its margin in overlapping relation to the strip 31, the grommets 26 are slipped over the latch posts 25. The end wall 9 is then folded inwardly and the flap 10 thereon is caused to overlie portions of the walls 17 and 18. The grommet 11 is slipped over the uppermost latch post 25 into overlying relation with the uppermost grommet 26 on said post. The closure flaps 12, 13, 14 and 15 are folded inwardly for closing the corners of the upper end of the container. The front wall 4 is then folded upwardly to overlie the top portions of the side walls 17 and 18 and the posts 25 are slipped through the openings 7 and through the corresponding registering openings 29 in the latch plates 28. In this condition the outer end portions of the posts are in substantial alinement with the anchor posts 30 on the plates 28. In this connection it is desired to state that the posts 30 are formed with openings 35 which aline with a similar opening 36 in each of the posts 25. The flaps 5 and 6 are folded inwardly to close the lower corners of the container.

After the container has been folded as hereinbefore described and as shown in Figure 3 of the drawings, the rip cord is connected therewith. The rip cord is shown generally at 37 and includes a flexible cable 38 which, as best seen in Figure 1, is provided with an extension 39 to which is attached a handle 40, said handle being swingingly connected to one of the straps of the harness, to be described hereinafter, by a loop 41. As will be seen, the handle is, in the embodiment shown, of substantially triangular shape and will lend itself for convenient manual engagement. The section 38 of the rip cord 37 extends above the strip 31 and carries latch pins 42 which are spaced along the length of said section and are offset therefrom. One of the latch pins 42 is provided for each of the cooperating posts and latch plate assemblies and, as best seen in Figure 4, extends through the openings 35 in the anchor posts 30 and through the opening 36 in the latch post 25 for retaining said latch posts against displacement from the latch plates. It will thus be seen that, in view of the fact that the latch posts cooperate with the grommets 11 and 26, the openings 7 and the latch plates 28 for retaining the walls of the container in cooperative relation, engagement of the pins 42 through said posts and through the anchor posts will effectively retain the container in made-up or operative position.

After the rip cord has been attached to the container, the cover flap 32 is folded to overlie the rip cord mechanism and the fasteners 33 are snapped on the posts 34 for defining a pocket for the rip cord.

In order to assist in opening the container after release of the rip cord mechanism, I provide flexible bands 43 which are three or more in number. Each of the bands 43 carries a hook 44 at each end and said hooks 44 are engageable in eyes 45 which are mounted on the surface of the front wall 4 at each side of the strip 31 thereof. That is to say, the bands 43 extend about the container and are, by reason of their own resiliency, held under tension. When the rip cord is released, the bands will immediately contract for spreading the side walls and permitting immediate discharge of the parachute contained within the container.

To release the parachute from the container, it is only necessary to exert a pulling or jerking action on the handle 40 for jerking the rip cord upwardly. When this is done, each of the latch pins 42 will be freed from its associated latch post 25 and from the anchor posts associated with said latch post. The plates 28 and the grommets 11 and 26 will then be permitted to slip off the post with the result that the walls of the container will be free to spread. As stated, the bands 43 will cause quick spreading of the side walls and, thus, discharge of the parachute from the container.

It is desired particularly to emphasize that the releasing action of the rip cord will be practically instantaneous so that the parachute will be permitted to open immediately upon jerking of the rip cord.

Attention is also directed to the fact that the anchor posts will cooperate with their associated latch posts for effectively, yet releasably, retaining the associated latch pin in place with the result that danger of accidental premature release of the parachute from the container will be practically eliminated.

The harness will now be described in more detail.

The harness includes a body strap which is shown generally at 46 and which is of substantially U shape contour. The body strap is of double thickness and includes a lower portion 47 which extends beneath the legs, rearwardly of the knees, when the aviator is in sitting position. The body strap also includes shoulder portions 48 and 49 which extend over the shoulders of the aviator and are connected to the inner edge of the upper end wall 9 of the pack by stitching 50. The shoulder portions 45 are provided with extensions 51 which terminate in loops 52. Although the extensions 51 are shown extending upwardly from the container, for the sake of clarity, said extensions would, when the container is made up, be contained within the body thereof. The loops 52 connect attaching rings 53 to said extensions, and said attaching rings connect the shroud lines of the parachute with the container.

Mounted on the rear surface of the wall 2 of the container, near its upper end and extending horizontally throughout the said rear wall is a connecting strip 54, said connecting strip having its opposite end and center portions stitched or otherwise suitably secured to the wall 2 and having loops 55 defined between the stitched portions. An adjusting strap 56 extends from one leg of the body strap 46, near the portion 49 thereof downwardly through one of the loops 55 and is then turned upwardly through the other of the loops and extended so that its free end connects with the opposite leg of the strap 46 near the shoulder strap portion 48 thereof. An adjusting loop 57 is carried on the strap 56 and is disposed below the connecting strip 54. Also extending through the loop 57 is an adjusting strap 58 which carries adjusting loops 59 and 60 at its opposite ends. Connected with one of the legs of the body strap 46 and extending through the loop 60 is a connecting strap 61, said connecting strap being extended and provided with a snap hook 62. The connecting strap 61, at its inner end, carries an adjusting loop 63 and is provided with an extension 64 which extends between the plies of the leg of the body strap and carries a snap hook 65 at its free end. The opposite leg of the body strap 46 carries a connecting strap 66 of identical construction to the strap 61. The strap 66 carries a snap hook 67 on the end of the extension 68. Similarly, the strap 66 is provided with an extension 69 which extends through a loop 70 defined by the plies of the leg of the body strap and carries a snap hook 71 at its free end. An adjusting loop 72, similar to the loop 63, is positioned in the strap 66. At 73 and 74 are shown leg straps which carry attaching loops 75 at their free ends and adjusting loops 76 along their legs. The straps 73 and 74 cooperate with the extensions 64 and 69 of the straps 61 and 66 for defining leg straps, the hooks 65 and 71 being engageable in the hooks 75 of said straps 73 and 74. For movably connecting the lower portion 47 of the body strap 46 with the lower end portion of the wall 2 of the container, I provide a substantially U-shaped strap 77 which extends through loops 78 and 79 which are defined by strips 80 and 81, respectively, secured on the rear surface of the wall 2 in horizontal spaced relation.

In operation the body strap extends along the sides of the body of the aviator and, as stated, the straps 73 and 74 cooperate with the extensions 64 and 69 respectively and extend about the legs of the aviator. The hooks 67 and 62 are connected with the result that the extension 68 and the corresponding extension of the strap 61 will extend across the aviator's midriff.

It will thus be seen that the harness will provide means for effectively mounting the container on the back of the aviator. Moreover, in view of the fact that I have provided the various adjusting loops, the harness will adjust itself automatically to the body of the wearer. That is to say, the loops will permit the harness to fit itself as snugly as possible to the contour of the aviator's body.

It is believed that from the above the construction and operation of my improved parachute harness and container will be thoroughly understood. Accordingly, further description is believed to be unnecessary.

Having thus described the invention, what is claimed as new is:

1. In a parachute harness and container, a harness having a body strap provided with shoulder portions, a strap connected between the container and the body strap and being shiftable with respect to the container for automatically adjusting the harness to fit about the body of an aviator, and an adjusting loop adjustably connecting said strap with the container.

2. In a parachute harness and container including a container having a rear wall, a harness including a body strap having shoulder portions having their ends connected with the rear wall, said shoulder portions having extensions for connection with the shroud lines of a parachute within the container, and means adjustably connecting the harness to the container and including an adjusting strap, a strip connected with the rear wall of the container and having loops receiving portions of the adjusting strap, and an adjusting loop carried on the strap below the loops.

3. In a parachute harness and container, a harness including a U-shaped body strap having a lower portion and having shoulder portions connected with the container, and means adjustably connecting the harness with the container and including adjusting straps connecting the upper portions of the legs of the body strap with the container, a strap slidably connecting the lower portion of the body strap with the container, and an adjusting loop slidably connecting the straps.

4. In a parachute harness and container, a container having a rear wall, a connecting strip carried on the rear wall and having loops, additional strips carried on the rear wall and defining horizontally alined loops, a harness including a body strap having shoulder portions connected with the rear wall of the container, said body strap having legs and a bottom portion, means extending between the legs and through the loops in the first-mentioned strip for adjustably connecting the upper portion of the harness with the container, and means connected with the lower portion of the body strip and extending through the horizontally alined loops for connecting the lower portion of the harness with the container.

5. In a parachute harness and container, a container formed from a single sheet of fabric and including a rear wall, reinforcing means for the rear wall, said container including side walls and end walls, one of said end walls being projected to define a flap, a top wall carried by the other of said end walls, the walls of said container being foldable to enclose a parachute, means carried by the top wall and engageable with the side walls and the flap for retaining the container in made-up position, and means co-operating with said last-mentioned means for releasably retaining said last-mentioned means in operative position.

6. In a parachute harness and container, rip cord release mechanism including a latch plate mounted on a wall of the container and having an opening, a latch post carried by another wall of the container and extending through the opening in the latch plate, said post and plate co-operating for normally retaining the walls in a folded position, said latch post having an opening, anchor posts carried on the latch plate and having openings alined with each other and with the opening in the latch post, and a parachute rip cord having a detent pin extending through the openings in the anchor posts and latch post for retaining the latch post against displacement from the anchor plate, said rip cord being shiftable for removing the detent pin from the openings for permitting separation of the latch post from the plate and spreading of the walls.

GEORGE GUSTERS COLEMAN.